United States Patent
Suermondt et al.

(10) Patent No.: US 6,826,683 B1
(45) Date of Patent: Nov. 30, 2004

(54) PREDICTING THE HEALTH OF A COMPUTER SYSTEM BY DETERMINING A SET OF MODIFICATIONS INVOLVED IN A PROPOSED INTERVENTION TO AN EXISTING SYSTEM

(75) Inventors: Henri Jacques Suermondt, Mountain View, CA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 09/695,184

(22) Filed: Oct. 23, 2000

(51) Int. Cl.[7] ............................ G06F 1/24; G06F 17/00; H02H 3/05
(52) U.S. Cl. ............................ 713/100; 714/3; 714/7; 706/50
(58) Field of Search ........................... 713/100; 714/3, 714/7; 702/183; 717/174; 706/50

(56) References Cited

U.S. PATENT DOCUMENTS

| | | | | |
|---|---|---|---|---|
| 4,888,771 A | * | 12/1989 | Benignus et al. | 714/26 |
| 5,761,380 A | * | 6/1998 | Lewis et al. | 706/47 |
| 5,790,780 A | * | 8/1998 | Brichta et al. | 714/46 |
| 5,953,533 A | * | 9/1999 | Fink et al. | 717/175 |
| 6,199,204 B1 | * | 3/2001 | Donohue | 717/178 |
| 6,202,207 B1 | * | 3/2001 | Donohue | 717/173 |
| 6,263,387 B1 | * | 7/2001 | Chrabaszcz | 710/302 |
| 6,266,407 B1 | * | 7/2001 | Kneipp et al. | 379/265.02 |
| 6,327,623 B2 | * | 12/2001 | Watts | 709/229 |
| 6,480,955 B1 | * | 11/2002 | DeKoning et al. | 713/100 |
| 6,484,128 B1 | * | 11/2002 | Sekiya et al. | 702/185 |
| 6,591,417 B1 | * | 7/2003 | Strysniewicz et al. | 717/168 |
| 6,618,857 B1 | * | 9/2003 | Zimniewicz et al. | 717/175 |

FOREIGN PATENT DOCUMENTS

| | | | |
|---|---|---|---|
| JP | 407219806 A | * | 8/1995 |
| JP | 411053175 A | * | 2/1999 |

OTHER PUBLICATIONS

Heiler et al., "Policy Driven Configuration Management of Network Devices", IEEE, 1996, pp 674–689.*
"Automated Replacement of System Software Units", IBM Technical Disclosure Bulletin, Mar. 1971, vol. 13, pp 3137–3138.*
"System Upgrade Utility (Customer Configuration)" IBM TDB Mar. 1989, vol. 31, pp 371–374.*
"Hp&cs: an Expert System Configurator for the IBM 9370" IBM TDB May 1989, vol. 31, pp 44–48.*

* cited by examiner

*Primary Examiner*—Thomas Lee
*Assistant Examiner*—Chun Cao (57) ABSTRACT

An arrangement for determining a predicted health of a system that would result from an application of a proposed intervention to an existing system. The predicted health is determined by determining a set of modifications involved in the proposed intervention wherein each modification involves one or more components of the existing system. For each modification, a set of component information that pertains to the modification is obtained from a knowledge base. Each set of component information may specify inter-dependencies among the components involved in the modification. For each modification, it is determined whether the inter-dependencies specified in the component information are satisfied. The determination of whether the inter-dependencies are satisfied enables a determination of the predicted health of individual components of the system as well as the predicted health of the overall system.

20 Claims, 5 Drawing Sheets

PREDICTING THE HEALTH OF A COMPUTER SYSTEM BY DETERMINING A SET OF MODIFICATIONS INVOLVED IN A PROPOSED INTERVENTION TO AN EXISTING SYSTEM

BACKGROUND OF THE INVENTION

1. Field of the Invention

The present invention pertains to the field of systems. More particularly, this invention relates to predicting system health in response to a proposed system intervention.

2. Art Background

The operation of a wide variety of systems commonly involves system changes such as the installation of new components, the modification or reconfiguration of existing components, or the removal of existing components. For example, the administration and/or maintenance of a computer system commonly involves the installation new hardware and/or software components, the modification or reconfiguration of existing hardware and/or software components, and the removal of existing hardware and/or software components.

The components of a system commonly have dependencies with respect to one another. The software components of a computer system, for example, commonly have particular hardware requirements such as processor type or speed and/or memory requirements, etc. In addition, software components commonly have software requirements such as operating system and/or drivers, etc. Similarly, the hardware components of a computer system commonly have software and/or hardware requirements.

As the number and complexities of inter-dependencies among system components increases, so does the likelihood that system changes will significantly degrade the ability of the system to function properly. Unfortunately, prior methods for performing system changes are usually ill suited to prevent system disruptions caused by the inter-dependencies among system components. For example, during installation of a new software component in a computer system a check is usually made, either manually or using installation software, to determine at whether the required amount of disk space and/or processor, operating system, etc., requirements are satisfied. Any problems caused by more complex inter-dependencies must usually be discovered and dealt with after the system change is performed. Unfortunately, this typically leads to decreases in system performance and increased system down time.

SUMMARY OF THE INVENTION

An arrangement is disclosed for determining a predicted health of a system that would result from an application of a proposed intervention to an existing system. The predicted health of a system may be defined as the ability of the system to function fully operationally without known impediments, slow-downs, etc.

The predicted health is determined by determining a set of modifications involved in the proposed intervention wherein each modification involves components of the existing system. For each modification, a set of component information that pertains to the modification is obtained from a knowledge base. The component information may include prerequisites for the proposed modification, or inter-dependencies among components involved in the modification. The component information enables a determination of the predicted health of individual components as well as the predicted health of the overall system. The prediction of health of individual components or of the overall system may be derived directly from the component information or indirectly from predictions of other intermediate determinations that are in turn derived from the component information.

These techniques may be characterized as an arrangement for preventive reasoning in that they enable the detection and prevention of problems that would be cause by the proposed intervention without degrading the performance or increasing the down time of the existing system. These techniques also enable an informed decision as to whether the intervention should be made, modified, or aborted.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
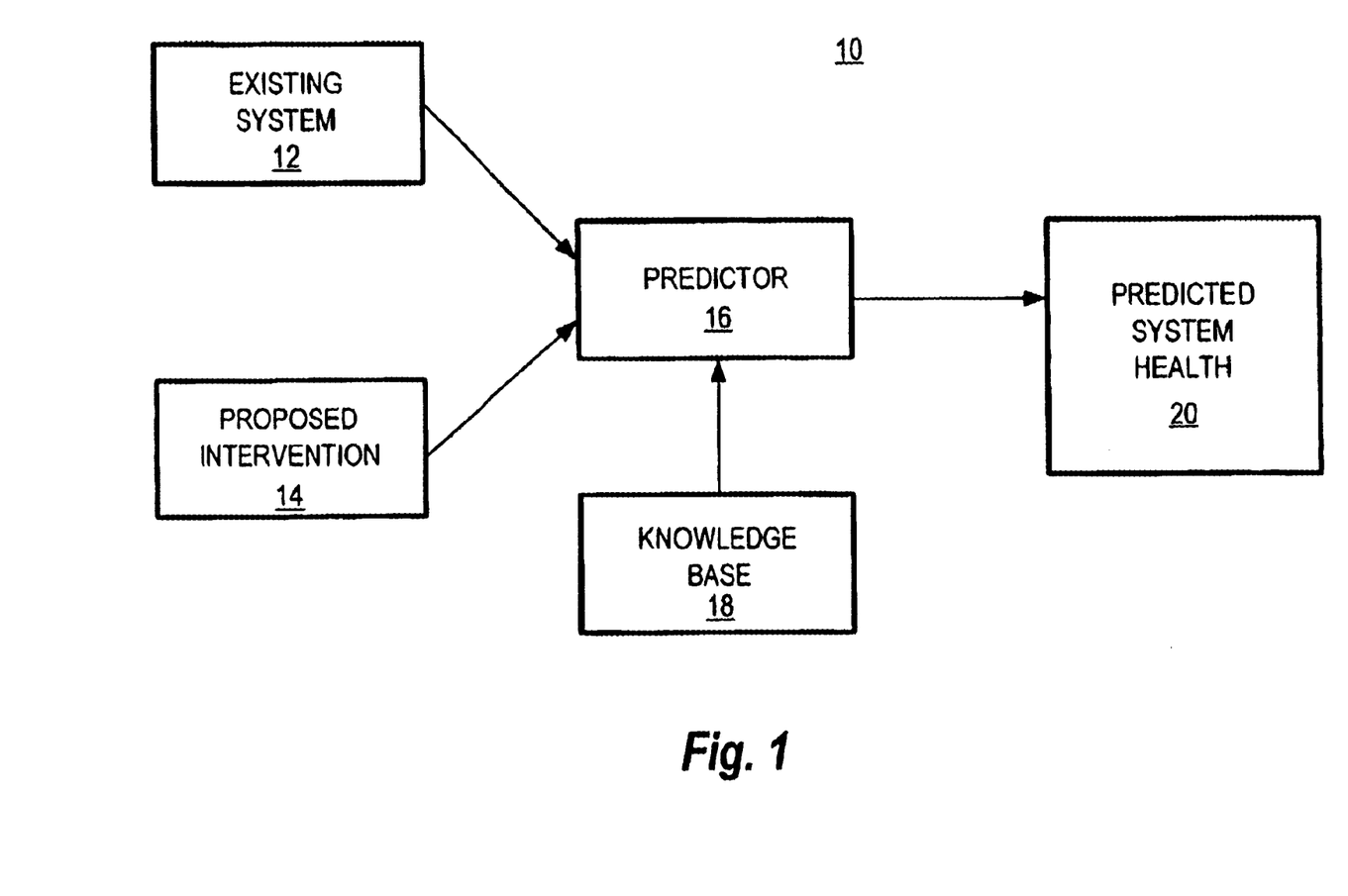
FIG. 1 shows an arrangement according to the present teachings.

FIG. 1 shows a arrangement 10 according to the present teachings. The arrangement 10 includes a predictor 16 which determines a predicted system health 20 which would result from the application of a proposed intervention 14 to an existing system 12. The predictor 16 uses information contained in a knowledge base 18 in rendering the predicted system health 20. In one embodiment, the predictor 16 determines the predicted system health 20 with an indication of uncertainty and may provide a probability distribution over a possible range of health states.

The existing system 12 represents any system which may exhibit any of the following characteristics. The existing system 12 may be characterized as one which is made up of a set of components each of which may be separately installed or removed from the existing system 12. In addition, the components of the existing system 12 may be reconfigured or may have associated parameters modified. Moreover, the components of the existing system 12 may have inter-dependencies with respect to one another. These inter-dependencies may be based on the configuration and/or parameters associated with the components.

Examples of the existing system 12 include computer systems such a personal computers, server systems, specialized controllers, test and measurement systems, and control systems.

The proposed intervention 14 specifies modifications to be applied to the existing system 12. A modification may be the installation of a new component, the removal of an existing component, or the modification of an existing component or any combination of these. A modification to an existing component may involve a modification to the configuration and/or parameters associated with the existing component.

Examples of a modification include the installation or the removal of a hardware component, the installation or the removal or replacement, for example with a new version, of a software component, the reconfiguration of a hardware or software component, and the modification of parameters associated with a hardware or software component.

The knowledge base 18 is an information store that contains information regarding known inter-dependencies associated with the components that may be used in the existing system 12. The inter-dependencies may be prerequisites and/or conflicts associated with the components. The inter-dependencies may involve the configuration and/or parameters associated with the components. In other embodiments, information regarding known inter-dependencies, etc., may be stored in a component itself or derived in real-time from other knowledge contained in the existing system 12. In addition, the knowledge base 18 may contain information regarding configuration requirements, resource requirements, etc. Also, the knowledge base 18 may contain information other than inter-dependencies among components such as component parameter settings, and information on interactions and dependencies that is useful in determining a predicted system health.

For example, the knowledge base 18 may store information indicating that a particular software component requires a particular operating system or operating system version in order to function properly. The knowledge base 18 may store information indicating that a particular software component requires a particular type or speed of processor or support library. The knowledge base 18 may store information indicating that a particular software component conflicts with other software components or is known not to work with hardware components. The knowledge base 18 may store information indicating that a particular hardware component requires a particular device driver or type or version of hardware interface or conflicts with some other hardware. The knowledge base 18 may store information indicating that a particular hardware or software component does not function properly under particular configuration/and or parameters settings. The knowledge base 18 may store information indicating that a particular hardware or software component does not function properly if some other hardware or software component has some particular configuration/and or parameters settings. The knowledge base 18 may store information of the health effects of not satisfying requirements.

In an alternative embodiment, the knowledge base 18 contains information that enables a mapping from information about the state, for example configuration, of one or more components to component health and to system health. In such an alternative embodiment, the information in the knowledge base 18 may be used in conjunction with a proposed intervention to predict component health and/or system health, either directly or indirectly through derivations or predictions about other intermediate determinations.

The information contained in the knowledge base 18 may include any information useful in determining a predicted system health and may be based on experience gained in customer-support trouble shooting operations. For example, experience may be gained in customer-support troubleshooting operations. The information contained in the knowledge base 18 may be based on an analysis of the actual interactions among various components that may be used in the existing system 12 and possible modifications to the components. This information may be obtained by manually or automatically analyzing the log entries of actual systems that are similar to the existing system 12, by interviewing those knowledgeable about the operation of actual systems that are similar to the existing system 12, or by analyzing the domain of systems and modifications to systems similar to the existing system 12 in other ways. The information contained in the knowledge base 18 may be gradually improved and updated as additional knowledge and/or experience with modifications to systems similar to the existing system 12 is gained.

The predicted system health 20 indicates the predicted health of a system that results from the application of the proposed intervention 14 to the existing system 12. The predicted system health 20 may be any indication that the system will function optimally verses sub-optimally and may be may be a numeric value or a non-numeric or qualitative indication. The predicted system health 20 may include a list of components that have been affected, adversely or beneficially, by the application of the proposed intervention 14. The predicted system health 20 may be used to render a decision, automatically or a user decision, as to whether the proposed intervention 14 should proceed or should be canceled or modified.

The predicted system health 20 may comprise several measures such as predicted responsiveness, reliability, availability, complexity, or ease of use. The measures may be combined to provide an overall subjective system health measure which may be used individually or in combination to render decisions.

The arrangement 10 may be embodied in a computer system or network of computer systems in which the existing system 12 is a model of an actual system to which the proposed intervention 14 may be applied. The existing system 12 and the proposed intervention 14 may be stored in a file system or data base or in memory. In addition, the knowledge base 18 may be stored in a file system or data base or a memory. The predictor 16 may be an application program on the computer system and the predicted system health 20 generated by the predictor 16 may be stored in a file system or data base and/or displayed on a display device.

Figure 2:
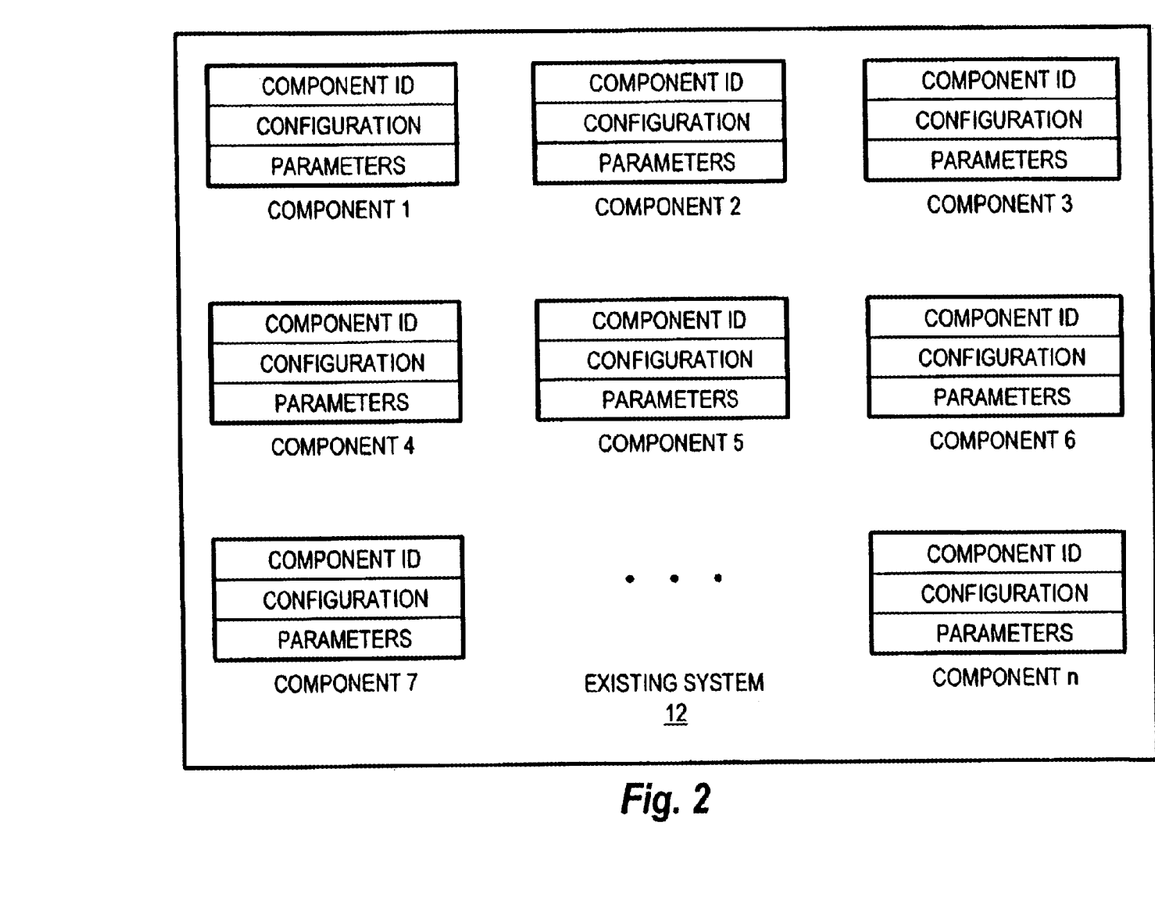
FIG. 2 illustrates one possible representation of an existing system.

FIG. 2 illustrates one possible representation of the existing system 12. In this embodiment, the existing system 12 is modeled as a set of components 1–n. Each component 1–n is represented using a uniform representation structure for components which includes a component identifier (ID), a configuration, and a set of parameters. The following discussion focuses on examples in which the existing system 12 is a computer system. Nevertheless, the teaching disclosed herein may be applied to numerous other types of systems.

Any of the components 1–n may be a software component or a hardware component. For example, the component 1 representation may be as follows:

Component ID: Pentium III

Configuration: Single Processor

Parameters:

Processor Speed: 500 MHZ

In some embodiments, the labels used in a representation, such as "Configuration" and "Parameters" may have different meanings for different entities and such name space issues may be resolved using a variety of known techniques.

In another example, the component 2 representation may be as follows:

Component ID: Win/NT ver. 4.0

Configuration:

Parameters: Service Pack 4

In yet another example, the component 3 representation may be as follows:

Component ID: Wordperfect ver. 7.1
Configuration: Printer=Default
Parameters:

In yet another example, the component 4 representation may be as follows:

Component ID: HP CD-ROM Model A
Configuration:
Parameters: Driver x.dll

Figure 3:
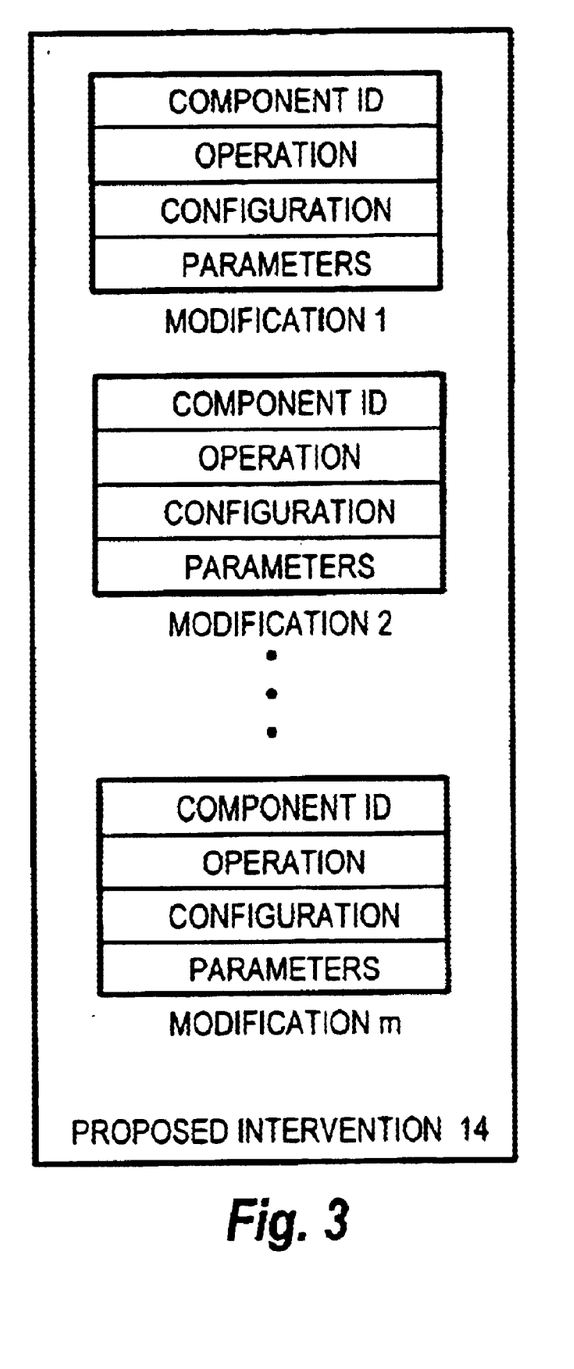
FIG. 3 illustrates one possible representation of a proposed intervention to an existing system.

In another example, the component 5 representation may be as follows:

Component ID: Flight Simulator Program A
Configuration: USB Port
Parameters: 16-bit color, Low Resolution FIG. 3 illustrates one possible representation of the proposed intervention 14. In this embodiment, the proposed intervention 14 is modeled as a set of modifications 1–m. Each modification 1–m is represented using a uniform representation structure for modifications which includes a component ID, an operation, a configuration, and a set of parameters. The component ID identifies a hardware or software component to be involved in the modification 1–m. The operation specifies operations such as install, remove, reconfigure, or modify parameters.

For example, the modification 1 representation may be as follows:

Component ID: ISDN modem Model C
Operation: Install
Configuration: USB
Parameters: Shared This specifies the installation of an ISDN modem configured for USB and parameters set to "shared."

In another example, the modification 2 representation may be as follows:

Component ID: Financial Program A
Operation: Remove
Configuration:
Parameters:

In yet another example, the modification 3 representation may be as follows:

Component ID: Flight Simulator Program A
Operation: Modify Parameters
Configuration:
Parameters: 24-bit color, High Resolution This specifies the modification of parameters for Flight Simulator Program A to 24-bit color and High Resolution graphics.

Figure 4:
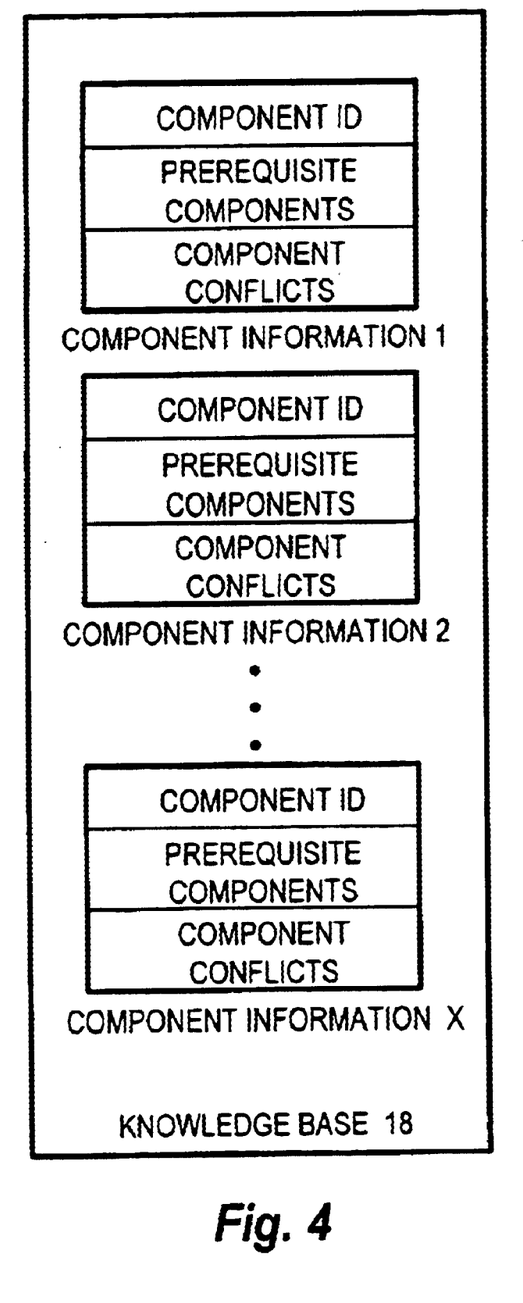
FIG. 4 illustrates one possible arrangement of information in a knowledge base according to the present techniques.

FIG. 4 illustrates one possible arrangement of information in the knowledge base 18. In this embodiment, the information in the knowledge base 18 is arranged into multiple sets of component information 1–x each of which specifies inter-dependencies, if any, involving the corresponding component. Each set of component information 1–x corresponds to a component which may be used in the existing system 12. Each set of component information 1–x includes a component ID, a list of prerequisite components, and a list of component conflicts.

The component ID identifies a component to which the corresponding component information 1–x applies. The predictor 16 matches the component IDs obtained from the existing system 12 and/or the proposed intervention 14 to the component IDs of the component information 1–x when looking up information from the knowledge base 18.

The list of prerequisite components in each set of component information 1–x identifies prerequisite components, if any, for the corresponding component. A list of prerequisite component contains zero or more entries each of which includes a component ID for a prerequisite component, a configuration for the corresponding prerequisite component, and a set of parameters for the corresponding prerequisite component.

The list of component conflicts in each set of component information 1–x identifies conflicting components, if any, for the corresponding component. A list of component conflicts contains zero or more entries each of which includes a component ID for a conflicting component, a configuration for the corresponding conflicting component, and a set of parameters for the corresponding conflicting component.

For example, the component information 1 may be as follows:

| Component ID: Financial Program A | | |
|---|---|---|
| Prerequisite Components: | Component ID: | Pentium II |
| | Configuration: | |
| | Parameters: | 100 MHz |
| | Component ID: | RAM |
| | Configuration: | |
| | Parameters: | 16 Megabytes |
| Component Conflicts: | Component ID: | Printer A |
| | Configuration: | Shared |
| | Parameters: | |
| | Other Info: | |

In this example, the component information 1 indicates that the Financial Program A requires at least a Pentium II processor with 16 megabytes of RAM to function properly. The component information 1 indicates that the Financial Program A will not function properly with the Printer A in the shared configuration.

In another example, the component information 2 may be as follows:

| Component ID: Video codec A | | |
|---|---|---|
| Prerequisite Components: | | |
| Component Conflicts: | Component ID: | Graphics Card A |
| | Configuration: | |
| | Parameters: | 32-bit color |
| | Other Info: | |
| | Component ID: | DVD Player A |
| | Configuration: | USB |
| | Parameters: | |
| | Other Info: | |

In this example, the component information 2 indicates that the Video codec A will not function with the Graphics Card A in the 32-bit color configuration or with DVD Player A having a USB interface.

Each set of component information 1–x may include a set of information regarding the health effects if the corresponding prerequisite components are missing and the health effects of the corresponding component conflicts exist. An explicit statement of a resulting malfunction may be specified for a missing prerequisite component. For example, this information for component 2 may indicate that the conflicting Graphics Card A may cause the Video codec A to not work with MPEG2. This information may be read by the predictor 16 and used in rendering the predicted system health 20.

Figure 5:
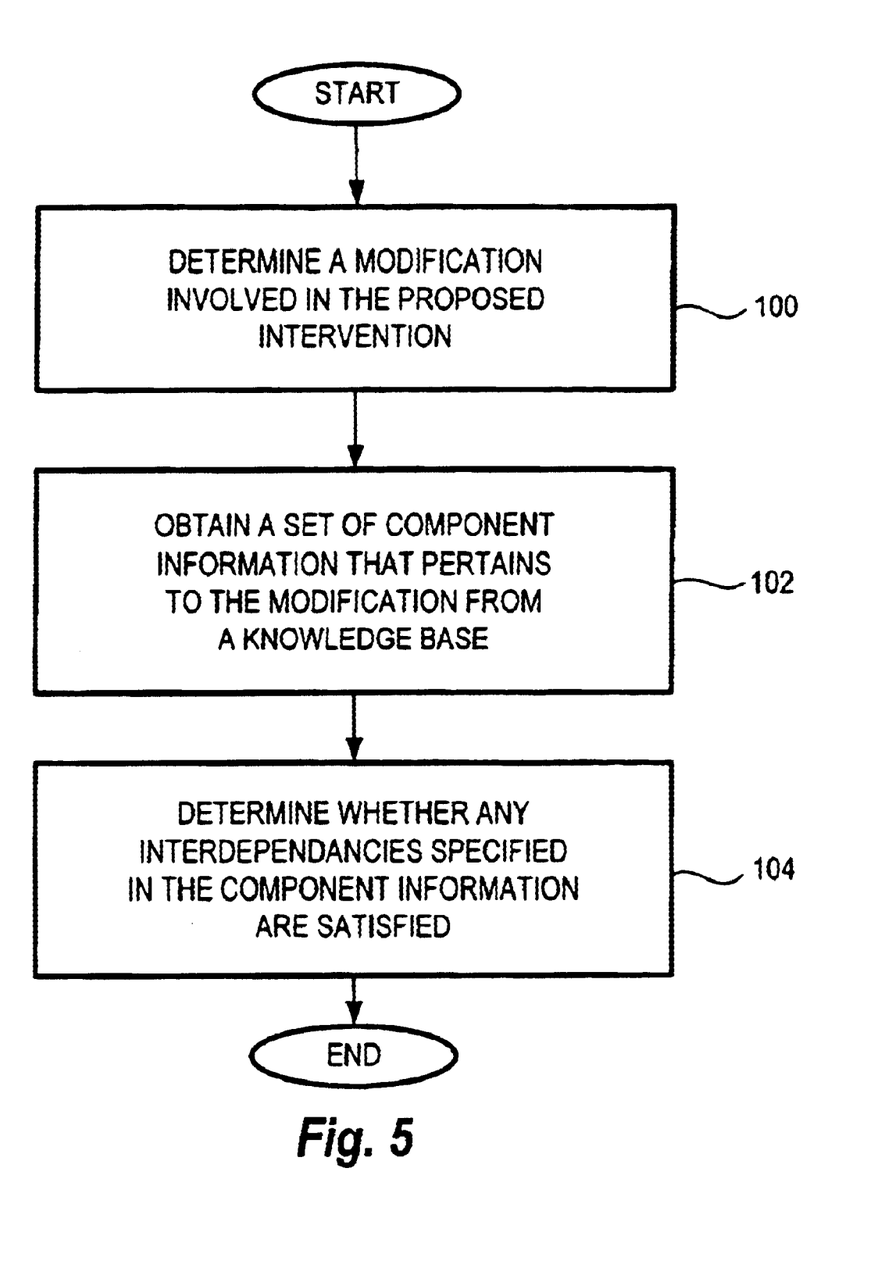
FIG. 5 shows actions performed by a predictor according to the present techniques.

FIG. 5 shows some of the basic method steps involved in for determining the predicted system health 20 in one embodiment. The method steps 100–104 are performed by the predictor 16 for each modification and combination specified in the proposed intervention 14. The predicted system health 20 is determined based on all of the modifications because later modifications may compensate for problems introduced by earlier modifications. It is desirable to ensure that the system will continue to function while the modifications are being made, thereby raising concerns about system health after the initial sequence of modifications are made. It is desirable that the predictor 16 suggest things that should not be done to the system while modifications are being made.

At step 100, the predictor 16 determines a modification involved in the proposed intervention 14. In a first example, the modification determined at step 100 is as follows:

| Component ID: Application A version 2 | |
|---|---|
| Operation: | Install |
| Configuration: | |
| Parameters: | |

At step 102, the predictor 16 obtains component information from the knowledge base 18 that pertains to the modification obtained at step 100. The component information provides information regarding inter-dependencies such as prerequisite components and component conflicts, if any, involving the modification. In the first example, the predictor 16 searches the sets of component information 1–x for ones matching Component ID="Application A version 2." In the first example, this yields the following:

| Component ID: Application A version 2 | | |
|---|---|---|
| Prerequisite Components: | Component ID: | Processor A |
| | Configuration: | |
| | Parameters: | 200 MHZ |
| | Component ID: | OS A |
| | Configuration: | |
| | Parameters: | update 1 |
| Component Conflicts: | Component ID: | OS A |
| | Configuration: | |
| | Parameters: | update 2 |
| | Other Info: | no network printers |

At step 104, the predictor 16 determines whether any the inter-dependencies specified in the component information obtained at step 102 are satisfied when the proposed intervention 14 is applied to the existing system 12. In the first example, the predictor 16 searches the existing system 12 and finds the following:

| Component ID: | Processor A |
|---|---|
| Configuration: | |
| Parameters: | 400 MHZ |
| Component ID: | OS A |
| Configuration: | |
| Parameters: | update 2 |

The predictor 16 compares the prerequisite component "Processor A" having a parameter of "200 MHZ" to the component information "Processor A" having a parameter of "400 MHZ" obtained from the existing system 12. The predictor 16 may implement a comparison function in which the parameter "400 MHZ" of the existing component "Processor A" satisfies the prerequisite of "200 MHZ" for the "Processor A" specified in the knowledge base 18. Thus, the prerequisite component "Processor A" is satisfied for the installation of the "Application A version 2."

The predictor 16 compares the conflicting component "OS A" having a parameter of "update 2" to the component information "OS A" having a parameter of "update 2" obtained from the existing system 12 and finds a match. Thus, a conflicting component "OS A" is found which will negatively impact the installation of the "Application A." The Other Info field of the component conflicts information for "Application A" in this example indicates that network printers will be negatively impacted.

The predictor 16 writes the predicted system health 20 with an indication that the "Application A version 2" in a resulting system will not have the use of network printers based on the inter-dependancy information obtained at step 102.

The predictor 16 optionally suggests changes to the proposed intervention 14 based on the inter-dependencies obtained at step 102. In the first example, the predictor 16 may suggest installation of an updated version of the "Application A" if available. The knowledge base 18 may contain component information of updates of the "Application A" and indicate whether these updates conflict with the "update 2" of "OS A." The predictor 16 may suggest installation of an update to the "OS A" if available prior to the installation of "Application A." The knowledge base 18 may contain component information for updates of the "OS A" and indicate whether these updates conflict with the "Application A version 2." The predictor 16 may perform steps 102–104 on a proposed update of the "OS A" to predict the health of the resulting system prior to predicting the outcome of a subsequent installation of "Application A version 2."

In a second example, the modification obtained at step 100 is as follows:

| Component ID: Application B version 1 | |
|---|---|
| Operation: | Install |
| Configuration: | |
| Parameters: | |

The predictor 16 obtains following component information from the knowledge base 18 at step 102 in the second example:

| Component ID: Application B version 1 | | |
|---|---|---|
| Prerequisite Components: | Component ID: | Print driver A |
| | Configuration: | |
| | Parameters: | |
| Component Conflicts: | | |

In the second example, the existing system 12 does not include "Print driver A." Thus, the prerequisite component "Print driver A" is not satisfied for the installation of the "Application B version 1." The predictor 16 writes the predicted system health 20 with an indication that the "Application B version 1" in a resulting system will not work.

The predictor 16 suggests installation of the prerequisite "Print driver A." The predictor 16 may perform steps 102–104 on a proposed installation of the "Print driver A" to predict the health of the resulting system prior to predicting the outcome of a subsequent installation of "Application B version 1."

In a third example, the modification obtained at step 100 is as follows:

| Component ID: Hardware Component C | |
|---|---|
| Operation: | Modify |
| Configuration: | |
| Parameters: | param1 = x1, param2 = x2 |

The third example involves the modification of parameters for an existing "Hardware Component C." The predictor 16 obtains following component information from the knowledge base 18 at step 102 in the third example:

| Component ID: Hardware Component C | | |
|---|---|---|
| Prerequisite Components: | | |
| Component Conflicts: | Component ID: | Driver A |
| | Configuration: | |
| | Parameters: | |
| | Other Info: | IF param1 = x1 |

This indicates that "Driver A" conflicts with a "Hardware Component C" having "param1=x1." In the third example, the existing system 12 includes "Driver A." Thus, the "Driver A" will conflict with "Hardware Component C" if the parameters for "Hardware Component C" are modified in accordance with the proposed modification and therefore the inter-dependancy will not be satisfied. The predictor 16 writes the predicted system health 20 with an indication that the "Hardware Component C" in a resulting system will not work. In the third example, the predictor 16 suggests that the conflicting parameter modification "param1=x1" not be made or that another be selected.

In a fourth example, the modification obtained at step 100 is as follows:

| Component ID: Driver C | |
|---|---|
| Operation: | Remove |
| Configuration: | |
| Parameters: | |

In the case of a component removal, the predictor 16 searches the knowledge base 18 for components having the component to be removed as a prerequisite component. The predictor 16 obtains following component information from the knowledge base 18 at step 102 in the fourth example:

| Component ID: Application C | |
|---|---|
| Prerequisite Components: | Component ID: Driver C |
| | Configuration: |
| | Parameters: |
| Component Conflicts: | |

In the fourth example, the prerequisite component "Driver C" would not be satisfied if the removal is carried out. The predictor 16 writes the predicted system health 20 with an indication that the "Application C" in a resulting system will not work. In the fourth example, the predictor 16 suggests that the modification not proceed.

The information in the predicted system health 20 may be used to generate a health value that indicates the overall health of a system that would result from the application of the proposed intervention 14 to the existing system 12. For example, if there are S components in the resulting system and the predicted system health 20 indicates that F components are negatively impacted, then one possible predicted health value is (S−F)/S. For example, if there are 10 components in the resulting system and 1 of them is negatively impacted then the system health is (10−1)/10=90 percent.

Individual ones of the components may be weighted based on an a priori determination of the relative importance of components. These weights may be used in calculating the predicted health value. A linear combination based on weight values is one example of a combination function. There may also be other functions including non-linear functions for mapping component health to overall system health. A combination function may ignore certain components, multiply their contributions, or apply a function to it. In a server system, for example, database related components may be given relatively high weight factor in comparison to rarely used applications for the server. The predicted health value may be compared to a threshold health value to determine whether the proposed intervention 14 should be applied to a system modeled by the existing system 12.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for determining a predicted health of a set of components of a computer system that would result from an application of a proposed intervention to the computer system, comprising:

providing information that represents the proposed intervention to a prediction program implemented by a computer, wherein the information comprises a component identification that represents a component of the computer system to the prediction program and at least one of a set of operational commands that represent operations of the computer system to the prediction program;

the computer determining a set of modifications involved in the proposed intervention, each modification involving one or more of the components of the computer system;

for each modification, the computer obtaining a set of component information that pertains to the modification from a knowledge base, each set of component information specifying a set of inter-dependencies among the components involved in the modification;

for each modification, the computer predicting a health of the computer system based on whether the inter-dependencies specified in the component information are satisfied.

2. The method of claim 1, wherein the inter-dependencies include a prerequisite configuration for one or more of the prerequisite components.

3. The method of claim 1, wherein the inter-dependencies include a prerequisite set of parameters for one or more of the prerequisite components.

4. The method of claim 1, wherein the inter-dependencies include one or more conflicting components for one or more of the components.

5. The method of claim 4, wherein the inter-dependencies include a conflicting configuration for one or more of the conflicting components.

6. The method of claim 4, wherein the inter-dependencies include a conflicting set of parameters for one or more of the conflicting components.

7. The method of claim 1, further comprising determining one or more changes to the proposed intervention in response to the predicted health.

8. The method of claim 1, further comprising generating a predicted health indicator by applying a combination function to a predicted health of each component in the system.

9. The method of claim 1, further comprising determining an indication of uncertainty associated with the predicted system health.

10. The method of claim 1 wherein the inter-dependencies include one or more pre-requisite components for one or more of the components.

11. A storage medium that stores computer readable instructions for determining a predicted health of a computer system that would result from an application of a proposed intervention to the computer system, when executed, the computer readable instructions perform a method comprising:

interpreting a representation of the proposed intervention, wherein the representation comprises a component identification that is associated with a component of the computer system and one of a set of operational commands that represent a proposed installation, a proposed removal, and a proposed reconfiguration of the component associated with the component identification;

determining a set of modifications involved in the proposed intervention, each modification involving one or more components of the computer system;

obtaining a set of component information that pertains to the modification from a knowledge base, each set of component information specifying a set of inter-dependencies among the components involved in the modification;

determining whether the inter-dependencies specified in the component information are satisfied.

12. The storage medium of claim 11, wherein the inter-dependencies include a prerequisite configuration for one or more of the prerequisite components.

13. The storage medium of claim 11 wherein the inter-dependencies include one or more pre-requisite components for one or more of the components.

14. The storage medium of claim 11, wherein the inter-dependencies include a prerequisite set of parameters for one or more of the prerequisite components.

15. The storage medium of claim 11, wherein the inter-dependencies include one or more conflicting components for one or more of the components.

16. The storage medium of claim 15, wherein the inter-dependencies include a conflicting configuration for one or more of the conflicting components.

17. The storage medium of claim 15, wherein the inter-dependencies include a conflicting set of parameters for one or more of the conflicting components.

18. The storage medium of claim 11, further comprising means for determining one or more changes to the proposed intervention in response to the predicted health.

19. The storage medium of claim 11, further comprising means for generating a predicted health indicator by applying a combination function to a predicted health of each component in the system.

20. The storage medium of claim 11, further comprising means for determining an indication of uncertainty associated with the predicted system health.

* * * * *